April 28, 1964 R. C. SABINS Re. 25,565

MOUNTING MEANS FOR CATHODIC PROTECTION ANODES

Original Filed Jan. 31, 1955

INVENTOR:
Rolland C. Sabins
BY J. F. McLellan
ATTORNEY

United States Patent Office

Re. 25,565
Reissued Apr. 28, 1964

25,565

MOUNTING MEANS FOR CATHODIC PROTECTION ANODES

Rolland C. Sabins, San Diego, Calif., assignor, by mesne assignments, to Sabins-Dohrmann, Inc., a corporation of California Original No. 2,826,543, dated Mar. 11, 1958, Ser. No. 485,008, Jan. 31, 1955. Application for reissue Dec. 1, 1959, Ser. No. 6,090

2 Claims. (Cl. 204—197)

Matter enclosed in heavy brackets [ ] appears in the original patent but forms no part of this reissue specification; matter printed in italics indicates the additions made by reissue.

The present invention relates to metal anodes and more particularly to a sacrificial metal anode which is provided with insulating materials to promote uniform consumption of the anode.

Various methods have been used to combat the characteristic galvanic corrosion of metals which occurs when such metals are surrounded by or submerged in an electrolyte such as moist earth, sea water, or the like. One of the most successful of these anti-corrosion methods of the prior art has been the use of sacrificial anodes, and, in particular, the use of sacrificial magnesium anodes.

As is well known, dissimilar metals are either anodic or cathodic to each other, and when a pair of such dissimilar metals are coupled together in the presence of an electrolyte the more anodic metal will corrode while the less anodic metal will be protected. The galvanic cell which is formed under these circumstances is characterized by an electrochemical phenomenon in which a flow of electric current is generated by the reaction between the metals and substances in the electrolyte. The flow of current is from the more anodic metal, or anode, into the electrolyte, thereby resulting in the release of metallic ions from the anode and causing eroding, pitting, or rusting of the anode. It will be evident that since the flow of current is always from the more anodic metal to the less anodic metal, the corrosion, for example, of steel in a steel-copper couple can be substantially prevented by inserting into the galvanic circuit an *expendable* [expandable] metal which is anodic with respect to the steel. A satisfactory metal for this purpose is magnesium since it *is higher in the electrochemical series in that it* has a higher solution potential, that is, it is more anodic, than any other of the more common commercial metals, including steel. In the presence of magnesium, both the copper and the steel become cathodic and the magnesium then serves as an auxiliary or sacrificial anode to which all the corrosion is transferred. However, it will be evident that the corrosion protection afforded the copper and the steel will last only until the magnesium anode is expended or consumed, thus making it very important that the sacrificial anode have as long an effective life as possible.

Heretofore sacrificial anodes were subject to early attrition because of the concentrated or localized galvanic action which took place immediately adjacent to portions of the internal core about which the anodic metal was cast, and immediately adjacent to the mounting brackets or bolts which secured the anode to the structure to be protected. As is well known, the characteristic localized action in these small areas not only eroded away the nearby anode metal, thereby undermining the fasteners so that the fasteners were rendered ineffective to hold the anode in position, but also the current wasted in flowing to these areas destroyed the desired current distribution to the areas sought to be protected. In effect, the outer ends of the anode core and the fasteners which provided the metallic electrical path from the protected structure to the anode, and upon which the full potential of the circuit acted, were part of a short circuit, and were themselves being provided concentrated cathodic protection by the immediately adjacent metal of the sacrificial anode. Consequently, the effectiveness of the circuit from the protected structure to the more remote portions of the anode was undesirably reduced, and there resulted a diminished or non-uniform current distribution to the anode proper and to the protected structure.

Accordingly, the sacrificial metal anode of the present invention is electrically insulated at those areas or points of usual concentrated galvanic action to thereby provide a metallic electrical return path from the protected structure to the anode which is uninterrupted by local dissipation. As will be seen, the present anode is especially adapted for use in a circuit wherein the current flow in the circuit may be controlled by appropriate resistances in the circuit. Further, in the anode of the present invention the galvanic flow of current is prevented from acting upon those portions of the anode core near the electrolyte, or upon the support fittings for the anode. In this manner premature attrition of the anode is substantially eliminated.

The present invention has particular utility in those situations wherein the sacrificial anode is fastened to or supported by the structure to be protected, but of course it is not to be limited thereto. It is to be understood that the present invention is adapted for use in connection with many anode metals, with various anode shapes, and in a variety of circumstances wherein uniform and controlled anode consumption is desired.

It is therefore a principal object of the present invention to provide an improved metal anode for providing cathodic protection and which is characterized by a relatively long service life.

Another object of the invention is to provide a novel metal anode for providing protection against corrosion, and which includes support structure so insulated that localized galvanic action between the support structure and the anodic metal is substantially eliminated for the greater portion of the effective life of the anode.

It is another object of the invention to provide a unique sacrificial metal anode adapted for dissipating or generating a uniform and controlled protective galvanic flow of current to a structure to achieve optimum corrosion protection for the structure.

An additional object of the invention resides in the provision of an improved sacrificial metal anode for effecting cathodic protection of a metal structure and which embodies a metal core suitably insulated from the electrolyte to substantially prevent localized galvanic action between the core and adjacent sacrificial metal of the anode for the greater portion of the effective life of the anode.

A still further object of the present invention is the provision of a novel sacrificial metal anode for providing cathodic protection and which is simple and economical to manufacture and adapted to promote uniform consumption of the anodic metal.

Other objects and features of the present invention will be readily apparent to those skilled in the art from the following specification and appended drawings wherein is illustrated a preferred form of the invention, and in which.

The description hereinafter made will be directed to an embodiment of the metal anode of the present invention which is particularly adapted for use in the cathodic protection of the steel hull of a ship in sea water. It is to be understood, of course, that the reference to a ship's hull is merely illustrative and not intended to limit the scope of the present invention whatsoever.

Figure 1:
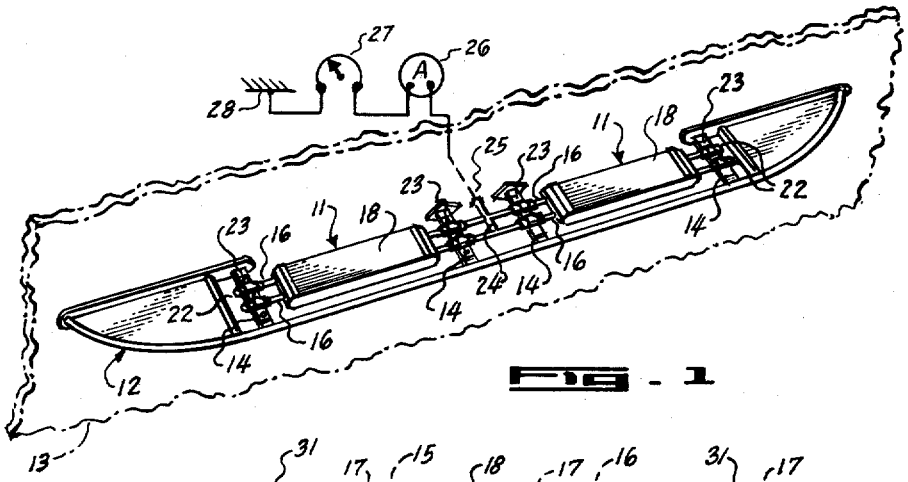
FIGURE 1 is a perspective view of a preferred embodiment of the metal anode of the present invention illustrating the manner of its mounting to the hull of a ship, which is indicated in phantom outline.

Referring to the drawings and more particularly to FIGURE 1, there are illustrated a pair of the metal anodes of the present invention, each being generally designated 11, rigidly mounted to any suitable structure, such as a bilge keel 12, of a ship's hull 13. The pair of identical anodes 11 are shown in a typical installation, and it will be apparent that any number of anodes 11 may be used, as desired, to provide cathodic protection for hull 13.

Bilge keel 12 is rigidly secured to hull 13 by any suitable means, as by welding, and serves as a convenient structure for maintaining anodes 11 in position. A plurality of lateral members 14 of keel 12 are transversely disposed across keel 12 to cradle or support the ends of anodes 11, as will be more fully described hereinafter, so that anodes 11 during use are located spaced from hull 13 and submerged in the sea water.

Figure 2:
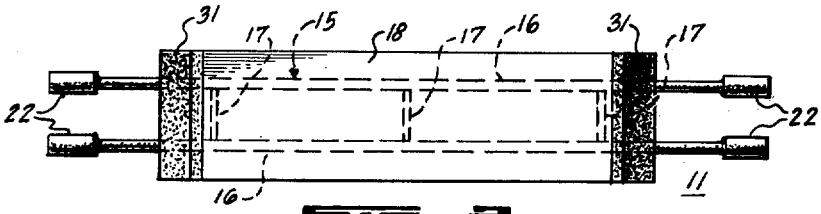
FIGURE 2 is a plan view of the metal anode of the present invention.
Figure 3:
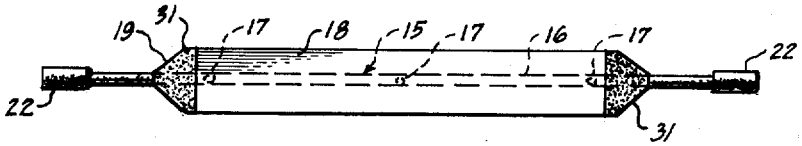
FIGURE 3 is a side elevational view of the anode of FIGURE 2.
Figure 4:
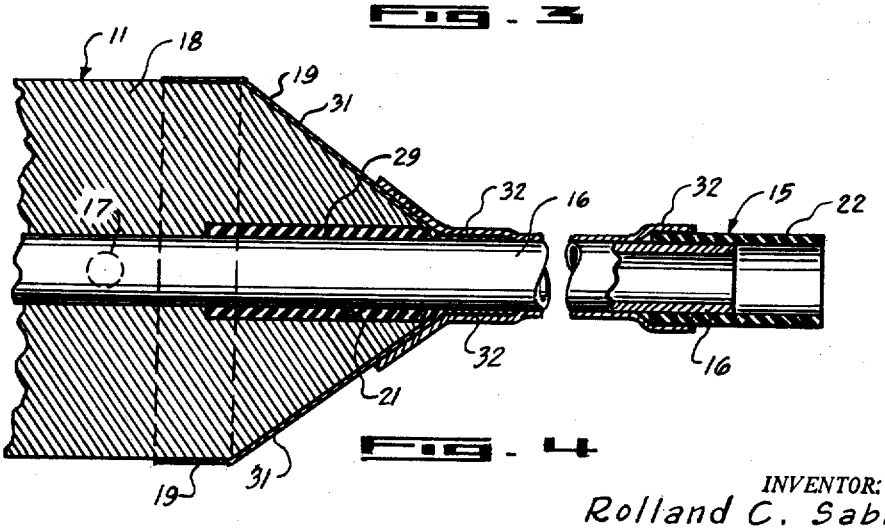
FIGURE 4 is a partial elevational cross-sectional view of the anode of FIGURE 2 on an enlarged scale.

Each anode 11, FIGURES 2 through 4, comprises generally a core 15 which includes a pair of laterally spaced, longitudinally extending core rods 16 weldably connected together by a plurality, preferably three in number, of transverse members or spur rods 17 to thereby form an integral composite core structure. Core rods 16 and spur rods 17 of core 15 are preferably made of standard iron pipe which is hot-dip galvanized to achieve a good bond with the anodic metal 18, and thus promote satisfactory electrical conductivity therebetween. In applications, such as the present one, where protection of a ship's hull against sea water is sought, magnesium is generally preferred for anodic metal 18. Any suitable mold may be employed which will permit the magnesium 18 to be cast or poured about core 15 to effect the form shown. It is noted that in the illustrated embodiment of the present invention, the magnesium 18 is cast to produce a substantially rectangular shape with the upper and lower transverse edges preferably beveled, as at 19, for improved resistance to the abrading effect of the water during movement of anode 11 through the water. In addition, during the casting of magnesium 18 an opening or cavity 21 is formed about each core rod 16 at each end of magnesium 18. Each cavity 21 extends inwardly from the end of the cast magnesium 18 to a distance or depth approximately equal to, and preferably slightly more than, the lateral distance between the galvanized surface of core rod 16 and the outside surface of the magnesium 18 which is exposed to sea water. Any of the well known methods of the casting art may be used to produce the cavities 21, such as the use of a removeable core of the shape of the desired cavity 21. The purpose of these cavities 21 will be described in greater detail hereinafter.

Except for beveled portions 19 of anode 11, the magnesium 18 is substantially uniform in transverse cross section, and the pair of core rods 16 are each spaced in from the sides, the top, and the bottom of anode 11 approximately the same distance. By virtue of the location of core rods 16, it will be evident that in the consumption of anode 11, there will tend to be a simultaneous exposure of all portions of core rods 16 rather than a premature exposure of any one portion of core rods 16. In this manner anode 11 is designed to continue functioning until magnesium 18 is substantially completely consumed. Perfectly uniform consumption of anode 11 is difficult to achieve for various reasons, such as, for example, impurities in the anodic metal 18 itself which create local galvanic cells in the metal 18; however, it will be obvious that in any event the relative location or disposition of magnesium 18 with respect to core rods 16 promotes a longer service life for anode 11 as compared to the service life which would have resulted had the present beneficial location or relationship between magnesium 18 and rods 16 not been recognized and utilized.

Each core rod 16 extends from the ends of the cast magnesium 18, as illustrated, and is provided at each end with a close-fitting, watertight electrical insulating tube 22. Tubes 22 serve to cushion and insulate the ends of core rods 16 at their connections to lateral members 14 of bilge keel 12, and for this reason tubes 22 are made of a resilient, watertight, and electrical insulating material such as a four-ply neoprene hose material, which has been found to work satisfactorily. A plurality of securing brackets 23 are disposed over the tubes 22 located on the ends of rods 16, and these brackets 23 are secured, as by bolts or the like, to lateral members 14, thereby maintaining anodes 11 in position upon keel 12. It is noted that this construction securely maintains anodes 11 in position and, in addition, electrically insulates anodes 11 from bilge keel 12.

As best illustrated in FIGURE 1, the near ends of the pair of anodes 11 are secured to a hull connector 24 which is constructed of metal pipe welded together to form the double-T shape illustrated. The T ends of connector 24 are disposed in tight fitting relation through the adjacent tubes 22 and into welded abutment with the ends of core rods 16 which are within tubes 22. This effects an electrical connection between core rods 16 and hull connector 24, and an internal metallic bushing (not shown) may also be used to assure a good electrical connection, being disposed within the hollow ends of rods 16 and connector 24. Thus, tubes 22 insulate connector 24 from bilge keel 12, and securing brackets 23 serve to maintain connector 24 in position. Preferably the open ends of tubes 22 located at the remote ends of the pair of anodes 11 are plugged with any suitable waterproof insulating material.

Connector 24 extends, as illustrated, through ship's hull 13, and is electrically insulated therefrom by a watertight hull fitting 25. Connector 24 is electrically connected, as indicated diagrammatically, to a current measuring device or ammeter 26, which is electrically connected to a variable resistance or rheostat 27, which in turn is electrically connected to the deck of the ship at 28, or to any other part of the ship which is electrically joined to ship's hull 13, as desired. With this construction and arrangement of elements it will be evident that [a return] *an* electrical path or circuit is provided from ship's hull 13, through the ship's deck at 28, through rheostat 27, through ammeter 26, through connector 24, through core rods 16, and thence to magnesium 18. This comprises the electrical [return] path or circuit for the cathodic protection system, providing a [return] circuit for the protective current which magnesium 18 is adapted to provide ship's hull 13. It is to be particularly noted that this [return] electrical path is, from the connection 28 at the ship's deck, electrically insulated from hull 13 whereby the flow of electric current therethrough may be regulated by rheostat 27. It will be apparent that if this [return] path were not insulated, *as at 25 by the hull fitting, or if the anodes 11 were not insulated by the electrical insulating tubes 22,* the flow of current would always be at its maximum value regardless of the current value required for cathodic protection of the hull 13. However, with the anode 11 of the present invention in the arrangement described, the flow of current through the [return] path may be regulated to provide the minimum value necessary for adequate cathodic protection of hull 13, such minimum value being readily determinable by trial and error for example. In this manner, anode 11 is adapted to be consumed at the minimum rate necessary, eliminating uncontrolled dissipation of magnesium 18 and promoting a comparatively long service life for anode 11.

Referring now to FIGURE 4, cavity 21 at each end of magnesium 18 is filled with an electrical insulating and waterproof material, such as a neoprene rubber material 29 of high dielectric properties which may be poured into cavity 21, setting up or hardening in a few days. A layer of similar electrical insulating waterproof material 31 is provided, as by a brush or the like, upon the ends of magnesium 18, extending completely about the ends of magnesium 18 from an area slightly longitudinally outward of the ends of magnesium 18 to an area slightly longitudinally inward of the beginning of the greatest transverse cross sectional area of magnesium 18. Further, electrical insulating waterproof material 32 in tape form is wrapped about the ends of core rods 16 in overlapping relation with both the insulating material 31 and the adjacent ends of tubes 22. In this manner the ends of magnesium 18 and rods 16 are not exposed to the electrolyte, here the salt water, and consequently galvanic current flow from the magnesium 18 tends to substantially all flow uniformly to ship's hull 13 rather than, for example, to portions of rods 16 which are external of magnesium 18 and dielectrically coated with tape 32 and a layer of neoprene over the tape. In addition, the provision of insulating material 29 in cavities 21 in magnesium 18, and of insulating materials 31 and 32, substantially prevents the localized or concentrated eroding away of the ends of magnesium 18 which are adjacent to core rods 16. Such eroding might otherwise occur because of the proximity of magnesium 18 to core rods 16, upon which the full potential of the circuit is applied, since both would be exposed to the salt water. Instead, insulating material 29 substantially eliminates exposure of contiguous portions of core rods 16 and the ends of magnesium 18 to the salt water until approximiately that time when the main body of magnesium 18 has been substantially consumed, thereby promoting a longer service life for anode 11.

While certain preferred embodiments of the invention have been specifically disclosed, it is understood that the invention is not limited thereto as many variations will be readily apparent to those skilled in the art and the invention is to be given its broadest possible interpretation within the terms of the following claims.

I claim:

1. In a cathodic protection system for a marine structure for regulating the flow of electrical current to the structure, said structure having an elongated bilge keel [with curved end portions thereon], an anode comprising a sacrificial elongated metal body disposed [within the curved end portions of] *along* the keel, a metal core disposed within and extending outwardly from opposite ends of said body, bracket means provided on the bilge keel and cooperating with each of the extending ends of the core for connecting the metal body in a stand-off relation to the structure a sufficient distance to maintain a uniform distribution of the electrical current about the structure to be cathodically protected, insulating means provided at the ends of said metal core for insulating the core at the stand-off bracket means, means electrically connecting the [stand-off connecting means] *anode* to a remote area of the marine structure.

2. In a cathodic protection system for a marine structure for regulating the flow of electrical current to the structure, said structure having an elongated bilge keel [provided with curved end portions], an anode comprising an elongated metal body disposed [within the curved end portions of] *along* the keel and having a mid-section of substantially uniform cross-sectional area and opposite end sections with beveled upper and lower transverse edges, a metal core disposed within and extending outwardly from opposite ends of said body, bracket means extending transversely across the keel for supporting the ends of the anode in a stand-off relation to the structure a sufficient distance to maintain a uniform distribution of electrical current about the structure to be cathodically protected, insulating means provided at the ends of said metal core for insulating the core at the [stand-off bracket means] *anode,* means electrically connecting the [stand-off bracket means] *anode* to a remote area of the marine structure.

References Cited in the file of this patent or the original patent

UNITED STATES PATENTS

| | | |
|---|---|---|
| 1,664,800 | Mills | Apr. 3, 1928 |
| 1,874,759 | Kirkaldy | Aug. 30, 1932 |
| 1,900,011 | Durham | Mar. 7, 1933 |
| 2,616,844 | Klumb | Nov. 4, 1952 |
| 2,656,314 | Osterheld | Oct. 20, 1953 |
| 2,776,941 | Oliver | Jan. 8, 1957 |
| 2,910,421 | Sabins | Oct. 27, 1959 |

FOREIGN PATENTS

| | | |
|---|---|---|
| 658,364 | Great Britain | Oct. 10, 1951 |
| 719,427 | Great Britain | Dec. 1, 1954 |
| 520,285 | Canada | Jan. 3, 1956 |